(12) United States Patent
Swartzlander, Jr.

(10) Patent No.: US 8,675,269 B2
(45) Date of Patent: Mar. 18, 2014

(54) OPTICAL LIFT APPARATUSES AND METHODS THEREOF

(75) Inventor: Grover Arthur Swartzlander, Jr., Rochester, NY (US)

(73) Assignee: Rochester Institute of Technology, Rochester, NY (US)

( * ) Notice: Subject to any disclaimer, the term of this patent is extended or adjusted under 35 U.S.C. 154(b) by 260 days.

(21) Appl. No.: 13/373,849

(22) Filed: Dec. 2, 2011

(65) Prior Publication Data

US 2012/0228483 A1 Sep. 13, 2012

Related U.S. Application Data

(60) Provisional application No. 61/419,721, filed on Dec. 3, 2010.

(51) Int. Cl.
*G02B 26/08* (2006.01)

(52) U.S. Cl.
USPC .................................... 359/196.1; 359/896

(58) Field of Classification Search
USPC .................... 359/196.1, 226.2, 896
See application file for complete search history.

(56) References Cited

U.S. PATENT DOCUMENTS

2012/0068066 A1* 3/2012 Takaya et al. ................. 250/306

OTHER PUBLICATIONS

"Optic Sail", IBM Technical Disclosure Bulletin, Document No. NN7908910, vol. 22, No. 3, pp. 910-911, Aug. 1, 1979.*

Maxwell, J. C., "A Treatise on Electricity and Magnetism", 1873, pp. 1-500, vol. 1, Oxford: Clarenden Press.
Borghese, F. et al., "Optical trapping of nonspherical particles in the T-matrix formalism", Journal article, Sep. 2007, pp. 11984-11998, vol. 15, Issue 19, Optics Express.
Nichols, et al., "The Application of Radiation Pressure to Cometary Theory", Astrophysical Journal, Jun. 1903, pp. 352-360, vol. 17.
Nichols, et al., The Pressure Due to Radiation, Astrophysical Journal, Jun. 1903, pp. 315-351, vol. 17:5.
Stratton, J. A., "Electromagnetic Theory", Book, 1941, pp. 156-159, McGraw-Hill, New York.
Ashkin, et al., "Optical Levitation by Radiation Pressure", Journal, Oct. 1971, pp. 283-285, vol. 19:8, Applied Physics Letters.
Burt, et al., "The Momentum of a Light Wave in a Refracting Medium", Proceedings of the Royal Society of London, Series A, May 1973, pp. 149-156, vol. 333.
Barber, et al., "Scattering of electromagnetic waves by arbitrarily shaped dielectric bodies", Dec. 1975, pp. 2864-2872, vol. 14:12, Applied Optics.
Cohen, et al., "Radiation pressure on randomly oriented infinite cylinders", Feb. 1980, pp. 558-560, vol. 19:4, Applied Physics.
Ashkin, et al., "Observation of a single-beam gradient force optical trap for dielectric particle", Optics Letters, May 1986, pp. 288-290, vol. 11:5, Optical Society of America.

(Continued)

*Primary Examiner* — Frank Font
(74) *Attorney, Agent, or Firm* — Joseph M. Noto; Bond Schoeneck & King PLLC (57) ABSTRACT

A method for optical lift includes receiving illumination in a first direction on at least one of two different surface profiles of one or more cambered refractive objects. The one or more cambered refractive objects are rotated to a position of stable rotational equilibrium in response to the received illumination. The one or more cambered refractive objects are moved in a second direction non-parallel direction from the first direction.

20 Claims, 5 Drawing Sheets

(56) References Cited

OTHER PUBLICATIONS

Mishchenko, M. I., "Radiation force caused by scattering, absorption, and emission of light by nonspherical particles", Journal of Quantitive Spectroscopy & Radiative Transfer, 2001, pp. 811-816, vol. 70.

Saija, et al., "Transverse components of the radiation force on nonspherical particles in the T-matrix formalism", Journal of Quantitive Spectroscopy & Radiative Transfer, 2005, pp. 163-179, vol. 94, 2005.

Overbye, D., "Setting Sail Into Space, Propelled by Sunshine", Article, Nov. 10, 2009, pp. 1-4, www.nytimes.com/2009/11/10/science/space/10solar.html, last retrieved from website on Nov. 18, 2011, New York Times.

Swartzlander, Jr., et al., "Stable optical lift", Article, Dec. 2010, pp. 1-4, vol. 266, Nature Photonics.

Sun, et al., "GHz optomechanical resonators with high mechanical Q factor in air", Journal article, 2011, pp. 1-6, Optical Society of America.

POV-Wiki, Documentation: Reference Section 6.2, http://wiki.povrqay.org/content/Documentation: Reference_Section_6.2, retrieved from website on Jan. 25, 2012.

Bartoli, A., "Il Calorico Raggiante E Il SecondoPrincipio Di Termodinamica", (Radiant Heat and the Second Law of Thermodynamics), Il Nuovo Cimento, 15, pp. 193-202 (1884).

Swartzlander, Jr., et al., "Optical vortex vectographics", Optics Letters, Apr. 2009, pp. 1216-1218, vol. 34:8, Optical Society of America.

* cited by examiner

OPTICAL LIFT APPARATUSES AND METHODS THEREOF

This application claims the benefit of U.S. Provisional Patent Application Ser. No. 61/419,721, filed Dec. 3, 2010, which is hereby incorporated by reference in its entirety.

FIELD

This invention relates to optical lift apparatuses that position and transport objects using non-contact optical forces and methods thereof.

BACKGROUND

Optical tweezers use a highly focused beam of light to provide an attractive or repulsive force to physically hold and move microscopic dielectric objects. Typically, this beam of light is focused by sending it through a microscope objective or other short focal length lens. The narrowest point of the focused beam of light, known as the beam waist, contains a very strong electric field gradient. Dielectric particles are attracted along the gradient to the region of strongest electric field which is the center of the beam of light. The beam of light also tends to apply a force on particles in the beam along the direction of beam propagation. This is known as the scattering force and results in the particle being displaced slightly downstream from the exact position of the beam waist.

Unfortunately, optical tweezers are limited to the small volume of light in the focal region and therefore are unsuitable for large areas of volumetrically dispersed objects. Additionally, optical tweezers do not work well across large depths. Further, the components needed to make optical tweezers are expensive.

SUMMARY

An optical lift apparatus includes one or more cambered refractive objects. Each of the one or more cambered refractive objects has at least two different surface profiles to configure each of the one or more cambered refractive objects to rotate into a position of stable rotational equilibrium and have a lift force in a non-parallel direction with respect to an incoming direction of illumination applied to one or more of the different surface profiles.

A method for making an optical lift apparatus includes providing one or more cambered refractive objects. At least two different surface profiles are formed on each of the one or more cambered refractive objects to configure each of the one or more cambered refractive objects to rotate into a position of stable rotational equilibrium and have a lift force in a non-parallel direction with respect to an incoming direction of illumination applied to one or more of the different surface profiles.

A method for optical lift includes receiving illumination in a first direction on at least one of two different surface profiles of one or more cambered refractive objects. The one or more cambered refractive objects are rotated to a position of stable rotational equilibrium in response to the received illumination. The one or more cambered refractive objects are moved in a second direction non-parallel direction from the first direction.

This technology provides a number of advantages including providing optical lift apparatuses which can position and transport an optical structure using non-contact optical forces without the need for focused beams. Additionally, unlike optical tweezers, with this technology an intensity gradient is not required and can be negligible while still achieving a transverse force. This technology can be used in a variety of different applications, including providing optical lift to power micro-machines, transport microscopic particles in a liquid, and to augment the design of solar sails for interstellar space travel.

BRIEF DESCRIPTION OF THE DRAWINGS

A brief description of the several views of drawing(s) with accompanying drawing figures is set forth below.

DETAILED DESCRIPTION

Figure 1:
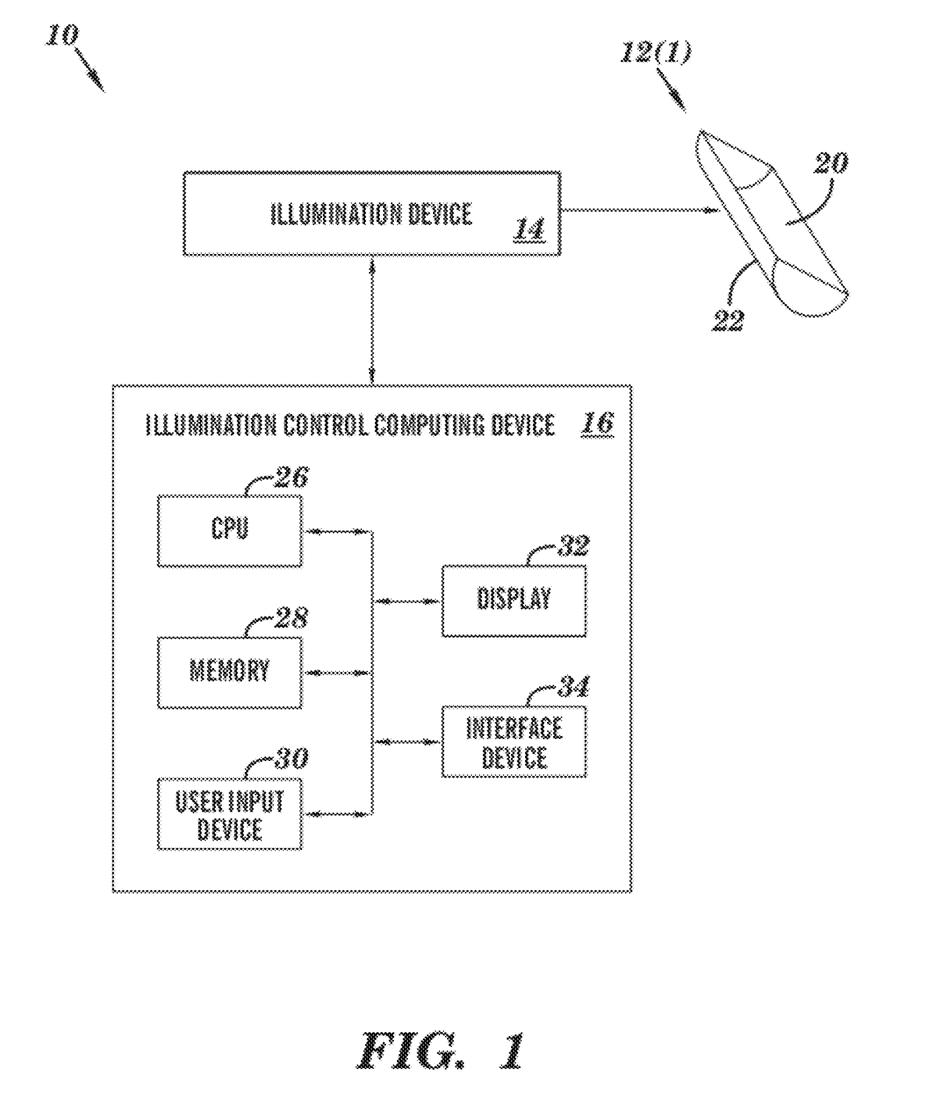
FIG. 1 is a block diagram of an exemplary optical lift apparatus.

An exemplary optical lift apparatus 10 is illustrated in FIG. 1. This exemplary optical lift apparatus 10 includes an optical structure 12(1), an illumination device 14, and an illumination control computing device 16, although the optical lift apparatus can comprise other types and numbers of device, components, and other elements in other configurations. This exemplary technology provides a number of advantages including providing optical lift apparatuses which can position and transport an optical structure using non-contact optical forces without the need for focused beams and with a negligible field gradient.

Referring more specifically to FIG. 1, the optical structure 12(1) is a semicircular rod having a flat surface 20 and a curved surface 22, although other types and numbers of cambered refractive objects having at least two different outer surface profiles can be used. One or more outer surfaces of the optical structure 12(1) may be chemically functionalized to allow other bodies, such as proteins by way of example, to stick to the optical structure 12(1) and therefore also be transported. By way of example only, DNA strands or long chain molecules can serve as a tether to connect at least one of the outer surfaces of the optical structure 12(1) to other structures, such as biological tissue.

Figure 2:
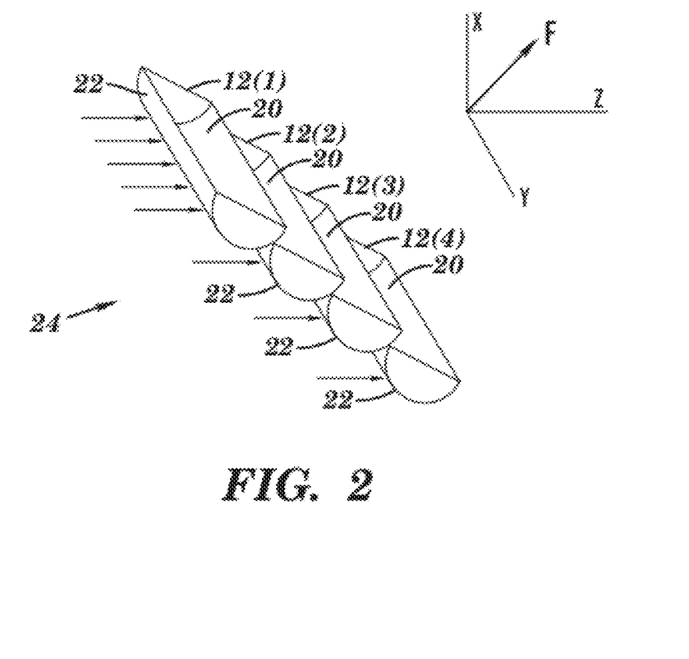
FIG. 2 is a perspective view of an exemplary optical sail.

Referring to FIG. 2, an optical sail 24 has an array of optical structures 12(1)-12(4) connected together to from a monolithic structure to allow the simultaneous propulsion and steering of the solar sail 24, although other types and number of structures and other elements can be used. Optical structures 12(2)-12(4) are each the same in structure and operation as optical structure 12(1), although other types and combinations of optical structures which are configured in other manners can be used. Solar sails can by way of example be used for transporting a small payload in free space. In this example, the flat outer surface profiles 20 of the optical structures 12(1)-12(4) are aligned to face in substantially the same direction, although the optical sail 24 could have other configurations. The array of the optical structures 12(1)-12(4) may optionally be mounted on a frame (not shown) or fabricated in a thin plastic membrane (not shown) to achieve a large force to mass ratio. Depending on the particular application, the optical structures 12(1)-12(4) separately or together, also may have one or more reflective or absorbing materials or layers, such as high reflection anti-reflection coatings by way of example, positioned to enhance either the lifting force or the scattering force. Additionally, one or more electro-optic elements (not shown), such as a shutter apparatus comprising one or more liquid crystal shutters or one or more mechanical louvers by way of example, may optionally be connected to the optical sail 24 and positioned between the light source and the optical sail 24 to control the exposure to incident light on the optical sail 24. For example, sections of the optical sail 24 can be oriented so that when exposed to light by the optional shutter system can be steered to the right and other sections of the optical sail can be oriented so that when exposed to light by the optional shutter system can be steered to the left by way of example. Similarly, sections of the optical sail 24 can be oriented so that when exposed to light by the optional shutter system can be steered up and other sections of the optical sail can be oriented so that when exposed to light by the optional shutter system can be steered down by way of example. Further, the optical sail 24 as well as any of the other exemplary optical structures 12(1)-12(4), separately or together, could be used without a controlled source of light and instead could be with uncontrolled sources of light, such as sunlight by way of example only.

Referring back to FIG. 1, the illumination device 14 is positioned to direct uniform illumination towards the optical structure 12(1), although other types and numbers of illumination devices could be used. In this example, the illumination device 14 is a coherent light source, such as a laser by way of example, although an incoherent light source, such as an arc lamp by way of example, or other types of light sources can be used.

The illumination control computing device 16 may be used to control the illumination device 14, although other manners for controlling the illumination device 14 can be used. In this example, the illumination control computing device 16 includes a central processing unit (CPU) or processor 26, a memory 28, a user input device 30, a display 32, and an interface device 34 which are coupled together by a bus or other link, although other numbers and types of systems, devices, components, and elements in other configurations and locations can be used. The processor 26 executes a program of stored instructions for one or more aspects of the present technology as described and illustrated by way of the examples herein including application of illumination to position and transport a cambered optical structure, although other types and numbers of processing devices and logic could be used and the processor could execute other numbers and types of programmed instructions.

The memory 28 stores these programmed instructions for one or more aspects of the present technology as described and illustrated by way of the examples herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 26, can be used for the memory 28.

The user input device 30 is used to input data and/or selections, such as when to apply illumination, although the user input device could be used to input other types of requests and data and interact with other elements. The user input device 30 can include keypads, touch screens, and/or vocal input processing systems although other types and numbers of user input devices can be used. The display 32 is a computer monitor, although other types and numbers of displays could be used.

The interface device 34 is used to operatively couple and communicate between the illumination control computing device 16 and the illumination device 14 via a communications network, although other types and numbers of communication networks or systems with other types and numbers of connections and configurations can be used.

Although an example of the illumination control computing device 16 is illustrated and described herein, this device can be implemented on any suitable computer system or computing device. It is to be understood that the computing device in the example described herein is for exemplary purposes, as many variations of the specific hardware and software used to implement the examples are possible, as will be appreciated by those skilled in the relevant art(s).

Furthermore, the computing device of the example may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for the computing device in the example. Accordingly, principles and advantages of distributed processing, such as redundancy and replication also can be implemented, as desired, to increase the robustness and performance of the devices and systems of the examples. The examples may also be implemented on computer device or devices that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The example may also be embodied as a non-transitory computer readable medium having instructions stored thereon for one or more aspects of the present technology as described and illustrated by way of the examples herein, as described herein, which when executed by a processor, cause the processor to carry out the steps necessary to implement the methods of the examples, as described and illustrated herein.

Figure 3:
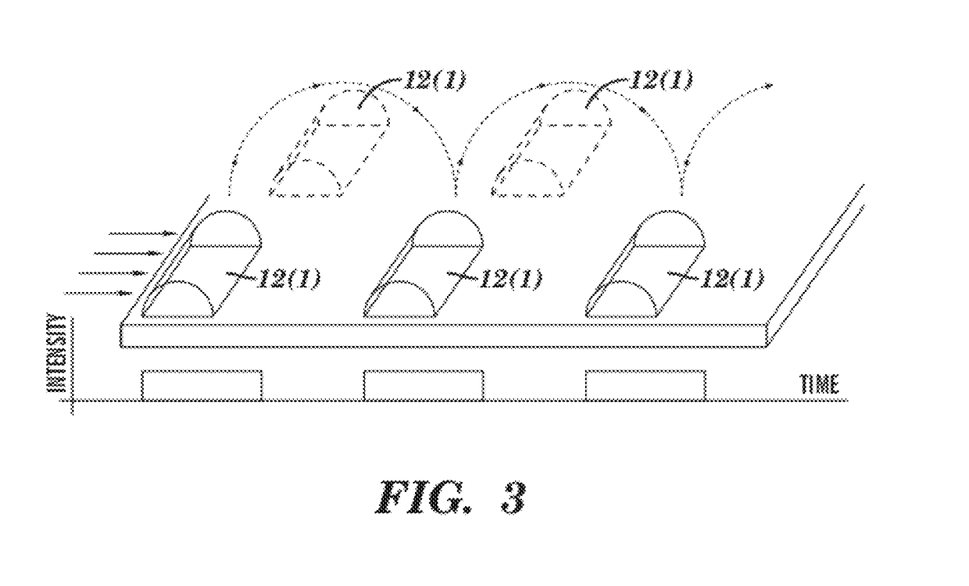
FIG. 3 is a functional diagram illustrating exemplary transport of the optical structure illustrated in FIG. 1.

Referring to FIG. 3, a functional diagram of how the optical structure 12(1) may be lifted from a surface and transported with a beam of light from illumination device 14 controlled by illumination control computing device 16 is illustrated. The optical structure 12(1) is illuminated with light from the illumination device 12. For example, uniform or weakly focused illumination may be used, either from a coherent light source such as a laser, or an incoherent light source, such as an arc lamp, can be used. The optical structure 12(1) causes the reflection, transmission, and refraction of light, thereby changing the momentum of the incident rays. The difference in momentum is imparted to the optical structure 12(1), causing the optical structure 12(1) to change its spatial position and angular orientation. When light illuminates the optical structure 12(1) at particular angles, the optical structure 12(1) experiences a constant force in a direction that has components that are parallel and perpendicular to the direction of the incident beam of light. The particular lift height and translation distance of the optical structure 12(1) is controlled by the duration of the optical pulse of light, shown in the exemplary intensity v. time graph, applied by the illumination device 14 from control signals from the illumination control computing device 16 and also from the shape of the optical structure 12(1). This optical lift may be used to transport either microscopic objects, such as biological tissue, or other particles in fluid, micromachines, attached to chemically functionalized surfaces or a macroscopic object, such as solar sail illustrated back in FIG. 2.

Figure 4A:
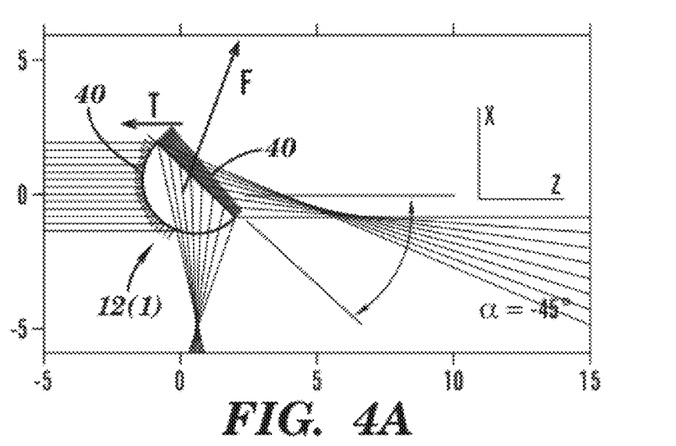
FIGS. 4a-4c are partial cross-sectional views and partial ray tracing illustrations of different angles of attack for the optical structure shown in FIG. 1 in water.
Figure 4B:
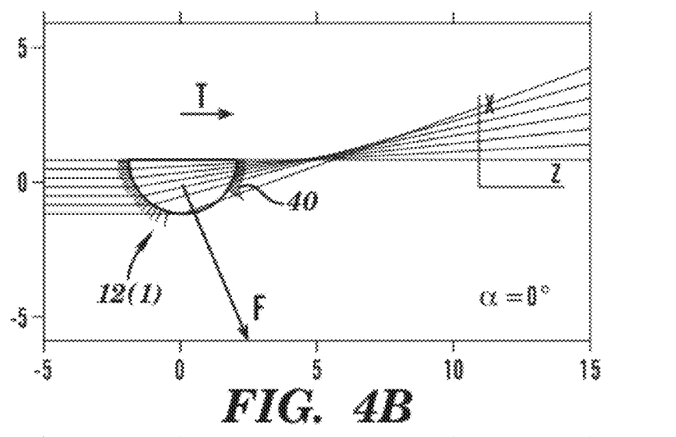
Figure 4C:
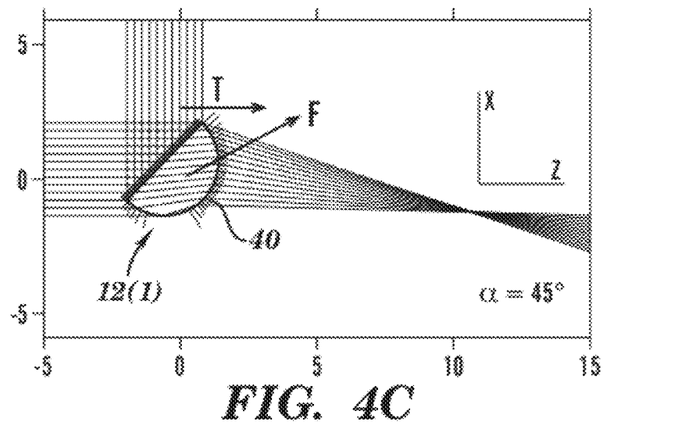

Referring to FIGS. 4a-4c, partial cross-sectional views and partial ray tracing illustrations of different angles of attack for the exemplary optical structure 12(1) in water are illustrated. As illustrated, the optical structure 12(1) comprising a semi-cylindrical rod will rotate into a position of stable equilibrium. In FIG. 4a the angle of attack, α, is −45 degrees, in FIG. 4b the angle of attack, α, is 0 degrees, and in FIG. 4c the angle of attack, α, is 45 degrees by way of example only The net force, F, and the rotational direction owing to torque, T, are indicated in FIGS. 4a-4c. The force vectors are drawn from the center of mass, which is located a distance $4R/3\pi$ along the bisector below the flat surface, where R is the radius of the semi-circle. The lift (levitation) component of force is in the x (z) direction. The lift component of force is in the positive x-direction when α=±45°, whereas it is in the negative x-direction when α=0°. The latter case is consistent with the direction of lift for a conventional airfoil. The optical structure 12(1) experiences a non-zero torque in all three examples. The horizontal arrows (purple) in FIGS. 4a-4c suggest counter-clockwise rotation when α=−45°, and clockwise rotation when α=0°, and α=45°. One may expect to find attack angles where the torque vanishes, providing stable lift, or where the lift force vanishes, producing stall. The optical structure 12(1) comprising the semi-cylindrical rod also experiences a forward scattering force for any attack angle, which corresponds to drag in aerodynamics Collimated rays from the illumination device 14 are incident from the left side in each of FIGS. 4a-4c. Lines 40 represent the Minkowski radiation pressure force for each ray, and reflected, refracted, and transmitted rays are illustrated as long straight lines, the net force vector is indicated by arrow F, and the direction of rotation owing to torque is indicated by arrow T. The lift force is positive in FIG. 4a and FIG. 4c and is negative in FIG. 4b. Torque causes the particle to rotate counterclockwise in FIG. 4a and clockwise in FIG. 4b and FIG. 4c. In the example illustrated in FIGS. 4a-4c, arbitrary spatial units are given.

Owing to the light-induced torque, the relative angle of attack, α, (i.e., the angle subtended by the incident rays and the flat surface 20 of the optical structure 12(1)) changes until the optical structure 12(1) reaches a position of stable rotational equilibrium. The particular angle of attack depends on the refractive index of the optical structure 12(1) and the surrounding material, as well as the shape of the optical structure 12(1). For example, the orientation displayed in FIG. 4b with an angle of attack (α=0) is stable when the refractive index of the optical structure 12(1) is 1.65 times that of the surrounding medium. For the optical structure 12(1) having a semicircular cross-section, the lift component of force (e.g., the vector component that is perpendicular to the direction of the incident light rays) is predicted to be optimal when the refractive index ratio is about 1.20.

Accordingly, in these examples the optical structure 12(1) comprising a semi-cylindrical rod will simultaneously torque about the y-axis toward a stable angle of attack and torque about the x-axis to align with the rays. The former will be energetically favorable if the length, L, of the optical structure 12(1) is much greater than its diameter, 2R, e.g., if $I_x=ML^2/12 \gg I_y=MR^2/2+M(4R/3\pi)^2$, where M is the mass of the optical structure 12(1). A ray tracing model confirmed that optical lift strongly dominates the tendency of the optical structure 12(1) to initially rotate in the direction of the beam when $L>20R$. Even with $L\approx3R$, as in the experimental demonstration, the alignment with the beam axis (as evidenced by an apparent shortening of the optical structure 12(1)) is a weak effect. When gravity, van der Waals force, or surface tension are included, the levitation force and beam-aligning torque may be negligible at a physical surface, and the optical structure 12(1) may simply slide along the surface.

The power required to achieve an optical lift effect may be determined by estimating the work done by raising the center of mass a distance h. Assume that the optical structure 12(1) comprises the semi-cylindrical rod of radius R, length L, and density, ρ, has settled to the bottom of chamber filled with liquid of density $\rho_0$, with the curved side of the optical structure 12(1) in contact with the chamber. Optical forces will cause the optical structure 12(1) to rotate by an angle θ, raising the center of mass a distance, h, where $h/R=\sqrt{1+\in^2-2\in\cos\theta+\in-1}$ and $\in=4/3\pi$. In the small angle approximation we write $h/R\approx(\theta/\theta_0)^2$ where $\theta_0=2(1-\in)/\in$.

Both the levitation force ($F_z$) and the torque do work to raise the effective mass, $\mu=\eta\rho_0\pi R^2 L/2$, against gravity, where $\eta=(\rho-\rho_0)/\rho_0$ is a buoyance parameter. Thus, $\mu gh=T\theta+F_z h=(n_1P/c)(RQ_T\theta+Q_z h)$. Hence the power required to achieve an optical lift effect is approximately $P=(\mu gc/Q_T n_1\theta_0^2)\theta$, assuming the torque-related energy is greater than the levitation energy. For an optical structure 12(1) having an effective mass of 100 picograms and an average torque efficiency of 10%, this amounts to a power across the rod of 0.4 mW if θ=30°. The total power of the illuminating beam from illumination device 14 must be proportionately larger—by a factor of the beam and rod cross-section ratio. Therefore, several tens of milliwatts of collimated light may be sufficient to observe the torque and transverse motion associated with optical lift.

Figure 5:
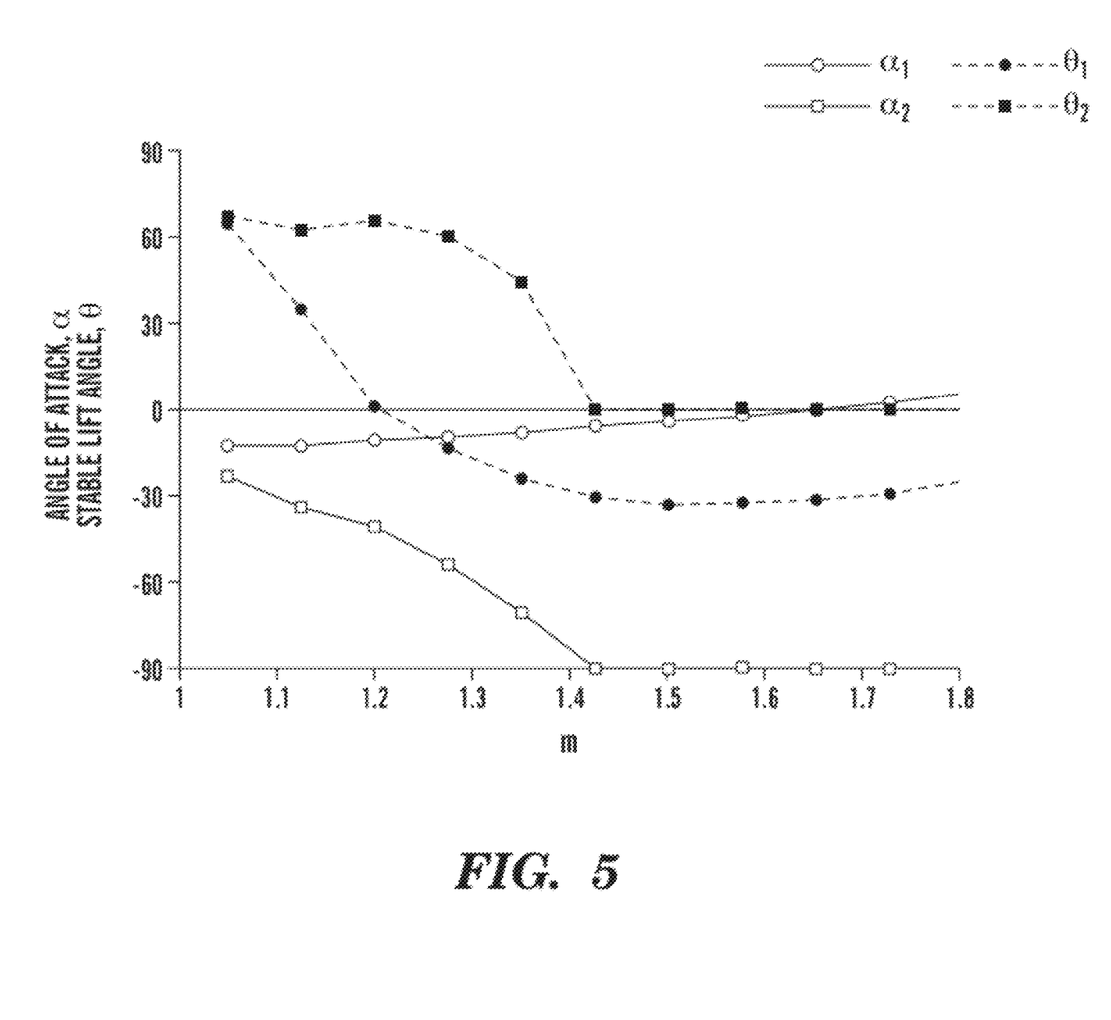
FIG. 5 is a graph of angle of attack, a, and corresponding lift angle, Θ, as a function of relative refractive index, m, for two stable orientations.

Referring to FIG. 5, a graph illustrating angle of attack, α, and corresponding lift angle, Θ, plotted as a function of relative refractive index, m, for two stable orientations are illustrated. A stall condition (zero lift angle) occurs for orientation-1 when m≈1.2, whereas a large lift angle Θ≈60° is predicted for orientation-2. Stall occurs for orientation-2 when m>1.4.

Stable rotational equilibrium is particularly important for applications that benefit from uniform motion. This requires both $T_y=0$ and $\partial T_y/\partial\alpha<0$. In this example, four attack angles, $\alpha_1$, $\alpha_2$, and $180°-\alpha_{1,2}$, where the semi-cylinder experiences stable non-zero lift forces were discovered. These occur when the relative refractive index, $m=n_{particle}/n_{host}$ falls an within the range of values from unity to 1.4, as shown in FIG. 5. When m>1.4, only two angles, $\alpha_1$ and $180°-\alpha_1$ provide stable lift. The corresponding lift angles plotted in FIG. 5, Θ=arctan ($F_x/F_z$), exceed 60° in some cases. Remarkably, the stable lift force can therefore exceed the scattering force by more than 70%. The values of $\alpha_1$ may be positive or negative, whereas $\alpha_2$ is always negative. Similarly, $\Theta_1$ may be positive or negative, whereas $\Theta_2\geq0$. The horizontal orientation, $\alpha_1=0$, is stable at m=1.65, resulting in a lift angle of $\Theta_1=-32°$. Also illustrated in FIG. 5 is that when the relative index has a value of m=1.2, the lift force stalls at $\alpha_1=-11.4°$. For isotropic materials the equilibrium and lift angles were computed to be weakly sensitive to the polarization state of the incident beam. Further calculations in the range 0<m<1 found the rod to be stable while erect ($\alpha_{1,2}=\pm90°$), although there was zero lift at these orientations. Accordingly, optical lift may be optimized for a given application by controlling not only the particle shape, but also optical properties such as refraction, reflection, and absorption Although in this example, the relative refractive index was about 1.2, the relative refractive index of the optical structure can range between about 1.0 and 2.0 and in some examples as illustrated in FIG. 5 between about 1.05 and 1.4.

For practical application, it is desirable to characterize and optimize the efficiency of the momentum transfer process. In this example, the ideal system is treated as having two dimensions, ignoring possible rotations of the optical structure into the direction of the beam of light. For incident rays directed along the z-axis, the net force and torque may be expressed in terms of efficiency parameters, Q:

$$\vec{F} = \frac{n_1 P}{c}(Q_x \hat{x} + Q_z \hat{z}) = \frac{n_1 P}{c} Q(\cos\Theta \hat{x} + \sin\Theta \hat{z}) \quad (3)$$

$$\vec{T} = \frac{n_1 PR}{c} Q_T \hat{y} \quad (4)$$

where P is the total beam power, $Q_x = Q \sin \Theta$ corresponds to the efficiency of lift, $Q_z = Q \cos \Theta$ corresponds to the forward scattering or levitation efficiency, $Q = \sqrt{Q_x^2 + Q_z^2}$, and $Q_T$ is the efficiency of torque. Computed efficiency values for the rotational equilibrium states $\alpha_1$ and $\alpha_2$, shows that lift is the dominant component of force for m<1.35. In particular, the magnitude of the lift efficiency is greatest at m=1.2 for the $\alpha_2 \approx -40°$ state, and vanishes at this value of m for the $\alpha_1 \approx -11°$ state. Accordingly, 10-20% of the incident beam momentum may be converted into a stable lift force for a dielectric rod having a semi-circular cross-section.

Figure 6:
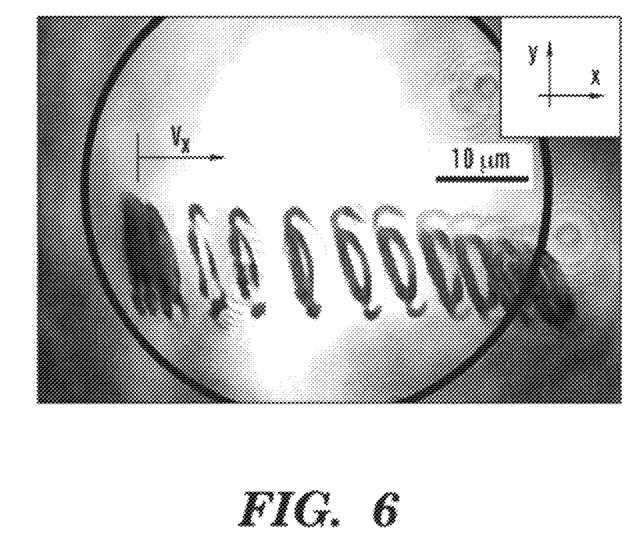
FIG. 6 is a time lapsed, composite image illustrating exemplary transport of the optical structure shown in FIG. 1.

Referring to FIG. 6, a time lapsed composite image of exemplary transport of the optical structure 12(1) is illustrated. In this example, a laser beam having a wavelength of 975 nm from the illumination device 14 was weakly focused to a diameter d=50 μm on a 150 μm thick optical structure 12(1) using a lens (not shown) of focal length f=60 mm. White light images were recorded through a 40× microscope objective onto a camera (not shown), with the laser wavelength (λ=975 μm) filtered out. The samples were mounted on a three-axis translation stage.

The time-lapsed composite image (1.67 seconds per shot) in FIG. 6 of the optical structure 12(1) comprises the semi-cylindrical rod lifting sideways from left to right near the bottom of a glass chamber, owing to a transverse optical lift force. The value of the relative refractive index of the optical structure 12(1) immersed in the chamber was m=1.2. The optical structure 12(1) initially experiences a torque, then exhibits a distinct translation, with a component of velocity, $v_x$, directed toward the right of the illustrated image. At roughly 130 mW the optical structure 12(1) comprising the semi-cylindrical rod rapidly rotated to a stable attack angle, and then simultaneously underwent lift and levitation as expected. Under similar experimental conditions, microspheres did not exhibit this effect. The optical structure 12(1) comprising the semi-cylindrical rod was not attracted to the center of the laser beam, as would have been the case if a strong transverse gradient force were present. The defocusing of the optical structure 12(1) comprising the semi-cylindrical rod in FIG. 6 is attributed to the levitation component of force. The maximum transverse speed was about 3.5 μm/s, and the average levitation speed was about 2.5 μm/s, resulting in a lift angle in the range of about $\Theta=55°$. As expected, the particle speed was greater in the central region of high power density.

Accordingly, as illustrated by this example a transparent, refractive optical structure 12(1) in the shape of the semi-cylindrical rod or cambered light foil experiences an optically-induced lift force, accompanied by a rotation to a stable orientation, when exposed to a uniform incident light field. With this technology, a lift force, i.e., a force perpendicular to the direction of the incident light beam from the illumination device 14 and an orientation of stable equilibrium results when the optical structure 12(1) is exposed to a uniform light field. This effect is based on the theory of radiation pressure.

An examination of the Kutta-Joukowski theorem of aerodynamic lift provides support for this optical lift. It states that the lift force in the x-direction is related to the pressure p at every point on a wing:

$$F_x = \oint p\hat{n} \cdot \hat{x} \, da \quad (1)$$

where $\hat{n}$ is the normal vector of the wing surface, and da is an area element on the wing surface. In optics, the Minkowski expression for the local force at a dielectric interface is always normal to the surface, and it is therefore equivalent to the factor $p\hat{n}$ da in equation (1). Numerical computations of the radiation pressure using ray tracing methods, followed by numerical integration, affords a simple means of computing the optical lift on an arbitrarily shaped particle, assuming the particle size is much greater than the wavelength of the illuminating beam. Smaller particles require a Lorenz-Mie approach to account for resonant effects. Owing directly to the Poynting theorem, the net force and torque do not depend on whether the Minkowski or Abraham momentum formulation is used. By computing both values, which disagree when too few rays are considered, an arbitrary degree of agreement and validity with this technology was achieved by increasing the number of rays.

The momentum change of a ray may be determined by accounting for the direction and strength of each transmission and reflection event. The force on a pencil of rays of incident power $P_j$, owing to both reflection and refraction at a single dielectric interface, may be expressed according to the Minkowski interpretation:

$$\vec{F}_{ray,j} = -(P_j/c)(n_{2,j} \cos \theta_{2,j}(1-R_j) - n_{1,j} \cos \theta_{1,j}(1+R_j))\hat{n}_j \quad (2)$$

where $n_{1,j}$ and $n_{2,j}$ are the respective indexes of refraction of the incident and refracted ray, and likewise, $\theta_{1,j}$ and $\theta_{2,j}$ are angles of incidence and refraction as governed by Snell's law ($n_{1,j} \sin \theta_{1,j} = n_{2,j} \sin \theta_{2,j}$), $\hat{n}_j$ is the outward normal unit vector, pointing from the interface, toward the material of index $n_{1,j}$, $R_j$ is the angle-dependent and polarization-dependent reflection coefficient, and c is the speed of light in vacuum. According to Newton's third Law of Motion, the force on the body from an individual ray is given by $\vec{F}_j = -\vec{F}_{ray,j}$. Refraction and the ensuing displacement of the rays, along with reflection, may produce a torque about the particle center of mass. The net force and torque on the body may be computed by summing over a large number of rays:

$$\vec{F} = \sum_j \vec{F}_j \text{ and } \vec{T} = \sum_j \vec{r}_j \times \vec{F}_j.$$

The moment arm $\vec{r}_j$ is a vector pointing from the particle center of mass to the point of intersection of the $j^{th}$ ray.

Accordingly, as illustrated in the examples herein refractive rods having an asymmetric camber may exhibit a transverse lift force, along with a forward scattering force, when exposed to a uniform collimated beam of light. Although this phenomenon is an optical analog to aerodynamic lift, it is refraction and reflection, rather than the Bernoulli principle, which accounts for the lift force. As many as four angles of attack that provide uniform lift without tumbling.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. An optical lift apparatus, the apparatus comprising one or more cambered refractive objects, each of the one or more cambered refractive objects having at least two different surface profiles to configure each of the one or more cambered refractive objects to rotate into a position of stable rotational equilibrium and have a lift force in a non-parallel direction with respect to an incoming direction of illumination applied to one or more of the different surface profiles.

2. The apparatus as set forth in claim 1 further comprising:
an illumination source positioned to direct uniform illumination where a gradient force is negligible towards the one or more cambered refractive objects; and
an illumination control computing device coupled to the illumination source to control application of the illumination to position and transport the one or more cambered refractive objects.

3. The apparatus as set forth in claim 1 wherein at least one of the one or more cambered refractive objects comprises a semicircular rod and the at least two different surface profiles comprise a flat outer surface profile and a curved outer surface profile.

4. The apparatus as set forth in claim 1 wherein a relative refractive index of the one or more cambered refractive objects to a surrounding medium is between about 1.0 and 2.0.

5. The apparatus as set forth in claim 1 wherein the one or more cambered refractive objects comprises a plurality of the cambered refractive objects which are connected together to form an optical sail.

6. The apparatus as set forth in claim 1 wherein at least one of the two or more outer surface profiles of at least one of the one or more cambered refractive objects is chemically functionalized to attract at least one type of biological material.

7. A method for making an optical lift apparatus, the method comprising:
providing one or more cambered refractive objects; and
forming at least two different surface profiles on each of the one or more cambered refractive objects to configure each of the one or more cambered refractive objects to rotate into a position of stable rotational equilibrium and have a lift force in a non-parallel direction with respect to an incoming direction of illumination applied to one or more of the different surface profiles.

8. The method as set forth in claim 7 further comprising:
positioning an illumination source to direct uniform illumination where a gradient force is negligible towards the one or more cambered refractive objects; and
coupling an illumination control computing device to the illumination source to control application of the illumination to position and transport the one or more cambered refractive objects.

9. The method as set forth in claim 7 wherein at least one of the one or more cambered refractive objects comprises a semicircular rod and the at least two different surface profiles comprise a flat outer surface profile and a curved outer surface profile.

10. The apparatus as set forth in claim 7 wherein a relative refractive index of the one or more cambered refractive objects to a surrounding medium is between about 1.0 and 2.0.

11. The method as set forth in claim 7 further comprising connecting two or more of the cambered refractive objects to form an optical sail.

12. The method as set forth in claim 7 wherein at least one of the two or more outer surface profiles of at least one of the one or more cambered refractive objects is chemically functionalized to attract at least one type of biological material.

13. A method for optical lift, the method comprising:
receiving illumination in a first direction on at least one of two different surface profiles of one or more cambered refractive objects;
rotating the one or more cambered refractive objects to a position of stable rotational equilibrium in response to the received illumination; and
moving the one or more cambered refractive objects in a second direction non-parallel direction from the first direction.

14. The method as set forth in claim 13 further comprising directing, by an illumination device, the received illumination to the one or more cambered refractive objects where a gradient force is negligible.

15. The method as set forth in claim 13 wherein the directing further comprises controlling, by an illumination control computing device, a duration of one or more pulses of the received illumination directed to the one or more cambered refractive objects.

16. The method as set forth in claim 13 wherein at least one of the one or more cambered refractive objects comprises a semicircular rod and the at least two different surface profiles comprise a flat outer surface profile and a curved outer surface profile.

17. The method as set forth in claim 13 wherein a relative refractive index of the one or more cambered refractive objects to a surrounding medium is between about 1.0 and 2.0.

18. The method as set forth in claim 13 wherein the one or more cambered refractive objects comprises a plurality of the cambered refractive objects which are connected together to form an optical sail.

19. The method as set forth in claim 13 further comprising transporting at least one type of biological material secured to at least one of the two or more outer surface profiles of at least one of the one or more cambered refractive objects which is chemically.

20. The method as set forth in claim 13 wherein the moving further comprises lifting the one or more cambered refractive objects in a second direction non-parallel direction from the first direction which is at least one of an upward direction, a downward direction, a left direction, and a right direction.

* * * * *